(12) United States Patent (10) Patent No.: US 9,253,521 B2
Jung (45) Date of Patent: Feb. 2, 2016

(54) IMAGE STREAMING SYSTEM FOR MINIMIZING RESOURCE USAGE OF NETWORK VIDEO RECORDER (NVR)

(71) Applicant: IDIS CO., LTD., Daejeon-si (KR)

(72) Inventor: Hee-Lock Jung, Seongnam-si (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 14/287,763

(22) Filed: May 27, 2014

(65) Prior Publication Data

US 2015/0208111 A1 Jul. 23, 2015

(30) Foreign Application Priority Data

Jan. 22, 2014 (KR) ........................ 10-2014-0007884

(51) Int. Cl.
| | |
|---|---|
| *H04N 5/935* | (2006.01) |
| *H04N 21/2743* | (2011.01) |
| *H04N 21/4223* | (2011.01) |
| *H04N 21/239* | (2011.01) |
| *H04N 21/61* | (2011.01) |
| *H04N 21/426* | (2011.01) |
| *H04N 1/21* | (2006.01) |
| *H04N 5/232* | (2006.01) |

(52) U.S. Cl.
CPC ....... *H04N 21/2743* (2013.01); *H04N 21/2393* (2013.01); *H04N 21/4223* (2013.01); *H04N 21/42684* (2013.01); *H04N 21/6175* (2013.01); *H04N 1/2112* (2013.01); *H04N 5/232* (2013.01)

(58) Field of Classification Search
CPC .............................. H04N 1/2112; H04N 5/232
USPC .......................................................... 386/210
See application file for complete search history.

(56) References Cited

U.S. PATENT DOCUMENTS

2011/0061085 A1* 3/2011 Savard et al. ................. 725/110
2012/0113265 A1* 5/2012 Galvin .......................... 348/159

FOREIGN PATENT DOCUMENTS

| KR | 10-2012-0055439 A | 5/2012 |
|---|---|---|
| KR | 10-2012-0103806 A | 9/2012 |
| KR | 10-2013-0119248 A | 10/2013 |

* cited by examiner

*Primary Examiner* — Nasser Goodarzi
*Assistant Examiner* — Michael Hong
(74) *Attorney, Agent, or Firm* — Novick, Kim & Lee, PLLC; Jae Youn Kim

(57) ABSTRACT

An image streaming system for minimizing resource usage of an NVR as it does not need to manage IP cameras nor require additional resources to stream images to a client device at a remote location since it is able to directly access an IP camera registered in the NVR without passing through the NVR to retrieve images from the IP camera and transmit the retrieved images to the client device, thereby preventing an increase of costs for the NVR.

7 Claims, 5 Drawing Sheets

IMAGE STREAMING SYSTEM FOR MINIMIZING RESOURCE USAGE OF NETWORK VIDEO RECORDER (NVR)

CROSS-REFERENCE TO RELATED APPLICATION(S)

This application claims the benefit under 35 U.S.C. §119 (a) of Korean Patent Application No. 10-2014-0007884, filed on Jan. 22, 2014, in the Korean Intellectual Property Office, the entire disclosure of which is incorporated herein by references for all purposes.

BACKGROUND

1. Field

The present invention generally relates to an image streaming technology and more particularly to a system for minimizing resource usage of a Network Video Recorder.

2. Description of the Related Art

In security systems, IP cameras are rapidly replacing analogue cameras, and thus, a Network Video Recorder (NVR), introduced in Korean Laid-open Patent Publication No. 10-2013-0119248 (Published on Oct. 31, 2013), is increasingly used as a substitute for a Digital Video Recorder (DVR) as a recording solution. Due to usage of IP cameras, high-definition images are widely used and the NVR needs to use more resources than the DVR to supervise/control the high-definition images. However, excessive resource usage drives an increase in costs of the NVR.

There are four primary tasks of an NVR.

1. registering and managing IP camera
2. displaying images of a camera on a screen
3. storing images of a camera
4. transmitting images of a camera to a client at a remote location The first task does not require a lot of resources, but the second, third, and fourth tasks are performed using an enormous amount of resources. Since every NVR is not connected to a client device at a remote location, the fourth task is not essential. Thus, minimizing resources required for the fourth task may help to reduce hardware costs for an NVR. However, as some cases still require performance the fourth task, it is necessary to develop a technology that not only reduces the hardware costs for an NVR, but also transmits a high-definition image to the client device.

Since a conventional NVR depends only on hardware performance, developing hardware products is the only way to transmit images from a remote distance, but such development requires additional costs and changes.

If a streaming server streams images of an IP camera at a remote location directly to a client device without passing through an NVR, the streaming server needs to manage IP cameras. In this case, in response to an event where an existing IP camera is replaced or where a new camera is added, the stream server needs to perform an additional management task.

In light of this background, the inventor of the present disclosure has studied an image streaming system for minimizing resource usage of an NVR: a system that does not need to manage IP cameras nor require additional resources to stream images to a client device at a remote location since the image streaming system is able to directly access an IP camera registered in the NVR without passing through the NVR to retrieve an image from the IP camera.

RELATED ART DOCUMENT

Patent Document

Korean Laid-open Patent Publication No. 10-2013-0119248 (Published on Oct. 31, 2013)

SUMMARY

The following description relates to an image streaming system capable of minimizing resource usage of an NVR, as it does not need to manage IP cameras nor require additional resources to stream images to a client device at a remote location since the image streaming system is able to directly access an IP camera registered in the NVR without passing through the NVR to retrieve images from the IP camera and transmit the retrieved images to the client device.

In one general aspect, there is provided an image streaming system for minimizing resource usage of a Network Video Recorder (NVR), including an access information manager configured to store, in a database, access information of each IP camera registered in at least one NVR; an information provider configured to provide streaming service related NVR information to at least one client device, wherein the streaming service related NVR information contains a list of the IP cameras registered in the at least one NVR; an image receiver configured to, in response to an image streaming request from a client device that has received the streaming service related NVR information, receive data of images from a particular IP by accessing the particular IP camera registered in the particular NVR with reference to the access information stored by the access information manager; and an image transmitter configured to transmit the received data of images to the client device at a remote location, which has received the streaming service related NVR information.

The access information manager may be further configured to dynamically collect, from the particular NVR, access information of each IP camera registered in the particular NVR and store the collected access information.

The streaming service related NVR information may contain a list of IP cameras registered in the NVR.

In response to selection of a particular IP camera from the list of IP cameras registered in the particular NVR contained in the streaming service related NVR information, the client device may issue an image streaming request related to the particular IP camera registered in the particular NVR.

The image receiver may be further configured to retrieve access information of the particular IP camera from the collected access information stored by the access information manager, and access the particular IP camera using the retrieved access information of the particular IP camera.

The image transmitter may be further configured to, in response to image streaming requests related to an identical IP camera from a plurality of client devices, multicast data of images received from the identical IP camera to the plurality of client devices.

The image transmitter may be further configured to, in response to image streaming requests related to different IP cameras from a plurality of client devices, unicast data of images received from each of the different IP cameras to the plurality of client devices.

Other features and aspects may be apparent from the following detailed description, the drawings, and the claims.

Figure 1:
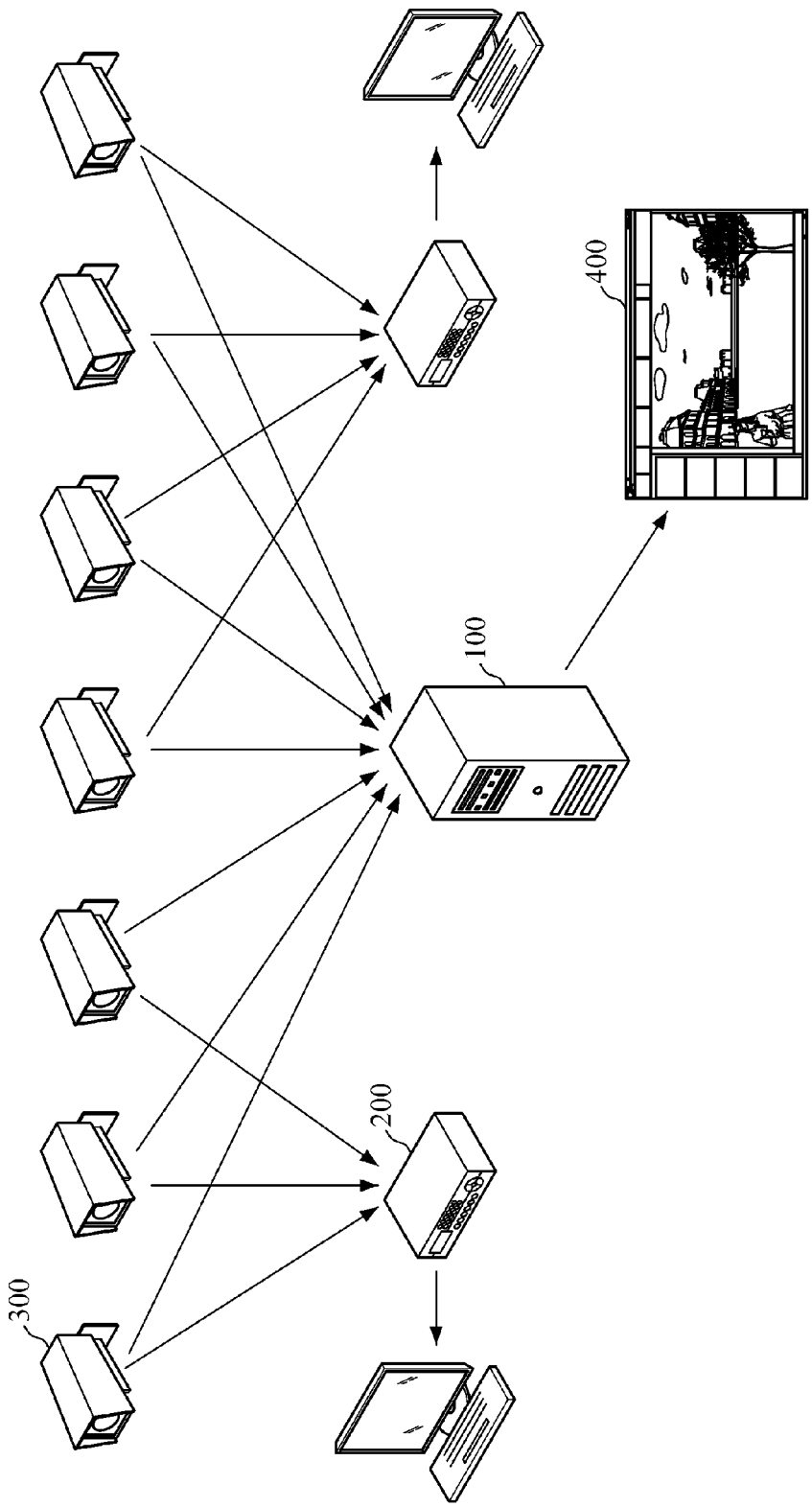
FIG. 1 is a schematic view illustrating a network of an image streaming system for minimizing resource usage of a Network Video Recorder (NVR) according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, in describing the present disclosure, detailed descriptions of relevant functions or structures well-known to those skilled in the art will be omitted when it is considered that the descriptions obscure the point of the present invention.

In addition, terms used hereinafter are defined in consideration of functions thereof in exemplary embodiments of the present disclosure. The terms may be changed according to intention or practices of a user or operator. Thus, each of the terms should be defined based on descriptions set forth herein.

FIG. 1 is a schematic view illustrating a network of an image streaming system for minimizing resource usage of a Network Video Recorder (NVR) according to an exemplary embodiment. As illustrated in FIG. 1, an image streaming system 100 for minimizing resource usage of an NVR according to an exemplary embodiment is wired/wirelessly connected to at least one NVR 200, IP cameras 300, and/or a client device 400, so that the image streaming system does not need to manage IP cameras nor require resources of an NVR 200 since it is possible to directly access an IP camera registered in the NVR to retrieve the images from the IP camera and stream the retrieved images to the client device 400 at a remote location.

Figure 2:
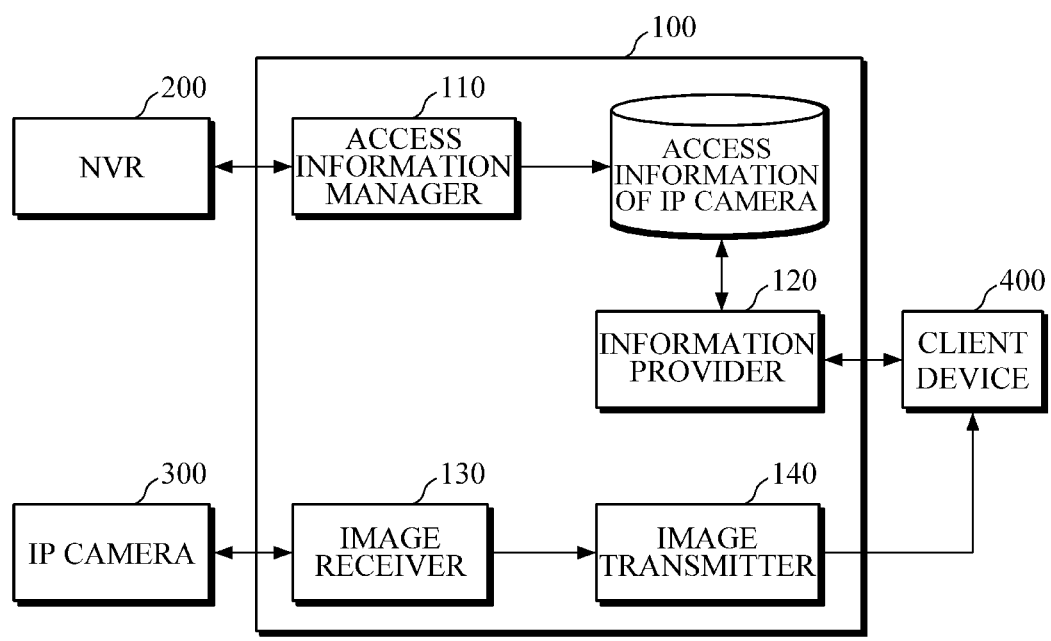
FIG. 2 is a block diagram illustrating an example of an image streaming system for minimizing resource usages of an NVR according to an exemplary embodiment.

FIG. 2 is a block diagram illustrating an example of an image streaming system for minimizing resource usage of an NVR according to an exemplary embodiment. As illustrated in FIG. 2, an image streaming system 100 for minimizing resource usage of an NVR according to an exemplary embodiment includes an access information manager 110, an information provider 120, an image receiver 130, and an image transmitter 140.

The access information manager 110 stores access information of each IP camera registered in at least one NVR 200 (See FIG. 1). For example, access information of an IP camera may include an IP address of the IP camera, and may further include an access ID and a password of the IP camera.

Configured to dynamically collect, from a particular NVR, access information of each IP camera registered in the particular NVR and store the access information of each IP camera registered in the particular NVR, the access information manager 110 may reflect addition, change, and deletion of a particular IP camera in access information of the particular IP camera registered in the particular NVR.

The information provider 120 provides streaming service related NVR information to at least one client 400 wherein the streaming service related NVR information contains a list of the IP cameras 300 registered to the NVR 200. The streaming service related NVR information may contain a list of IP cameras registered in the particular NVR.

In response to an image streaming request from a client device that has received the streaming service related NVR information, the image receiver 130 receives data of images from the particular IP camera registered in the particular NVR with reference to the access information stored by the access information manager 110.

In this case, the client device may issue the image streaming request in response to a user's selection of the particular IP camera from a list of IP cameras registered in the particular NVR contained in the streaming service related NVR information.

Meanwhile, the image receiver 130 may retrieve access information of the particular IP camera registered in the particular NVR from the access information stored by the access information manager 110, and then access the particular IP camera registered in the particular NVR using the retrieved access information of the particular IP camera.

The image transmitter 140 transmits the received data of images to the client device 400 at a remote location. In a case where a plurality of client devices 400 request image streaming related to an identical IP camera 300, the image transmitter 140 may multicast the received data of images received from the identical IP camera 300 to a plurality of client devices 400.

Alternatively, in a case where a plurality of client devices 400 request image streaming related to multiple different IP cameras 300, the image transmitter 140 may unicast data of images received from the multiple different IP cameras 300 to a plurality of client devices 400.

In such a configuration, an image streaming system for minimizing resource usage of an NVR according to an exemplary embodiment as it does not need to manage IP cameras nor require additional resources to stream images to a client device at a remote location since the image streaming system is able to directly access an IP camera registered in the NVR without passing through the NVR to retrieve images from the IP camera and transmit the retrieved images to the client device. As a result, it may prevent an increase in costs for the NVR.

A client device at a remote location receives a stream of images from an IP camera by accessing an image streaming system for minimizing resource usage of the NVR. However, the client device may regard the received stream as coming from the NVR because there is no difference in a user interface (UI) between a method of streaming images through an NVR and a method of streaming images through an image streaming system.

Further, when streaming images, the image streaming system may appropriately change specifications thereof in accordance with the number of current connected users or the average number of pilot channels, thereby establishing a cost effective system in accordance with customers' demands.

Moreover, the image streaming system constantly performs information synchronization with an NVR. Thus, in response to an event where a new camera is registered in the NVR or an event where an IP address of an existing camera changes, the image streaming system performs information synchronization to identify what kind of event has happened, and then establishes connection to a corresponding IP camera in accordance with the identified event. Therefore, an image streaming system for minimizing resource usage of an NVR according to an exemplary embodiment does not need to perform an additional IP camera management task.

Figure 3:
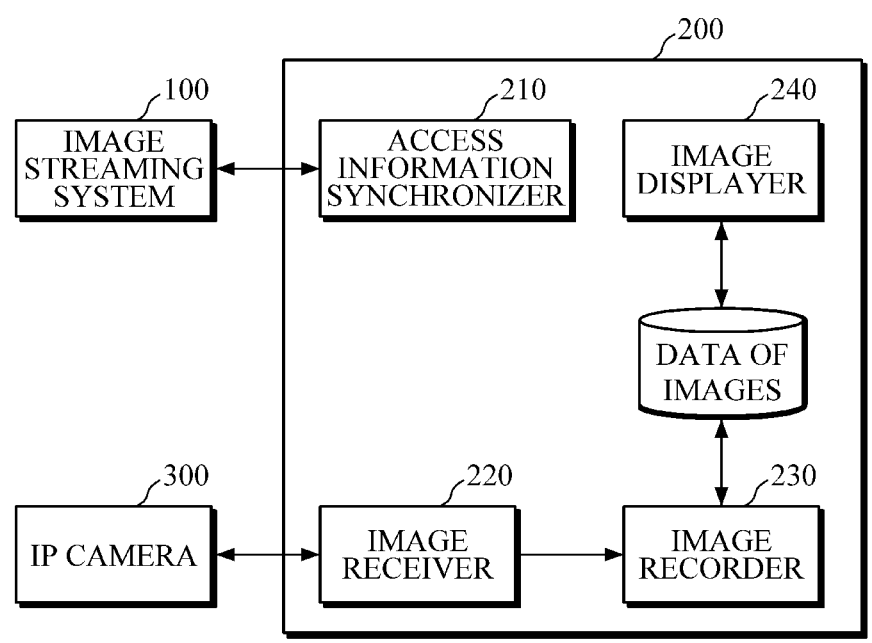
FIG. 3 is a block diagram illustrating an example of an NVR.

FIG. 3 is a block diagram illustrating an example of an NVR. As illustrated in FIG. 3, an NVR 200 includes an access information synchronizer 210, an image receiver 220, an image recorder 230, and an image displayer 240.

The access information synchronization 210 synchronizes access information of each IP camera registered in the NVR 200 by dynamically providing access information of each IP camera registered in the NVR 200 for the image streaming system 100 for minimizing resource usage of the NVR. For example, access information of an IP camera may include an IP address of the IP camera, and may further include an access identifier (ID) and a password of the IP camera.

The image receiver 220 receives data of images captured by each IP camera 300 registered in the NVR 200.

The image recorder 230 records the data of images by storing the data of images in a memory.

The image displayer 240 retrieves the data of images stored in the memory and displays the retrieved data of images.

In such a configuration, the NVR 200 uses the image receiver 220, the image recorder 230, and the image displayer 240 to receive, record, and display images captured by each IP camera, while using the access information synchronizer 210 to provide access information of each IP camera to the image streaming system 100.

Figure 4:
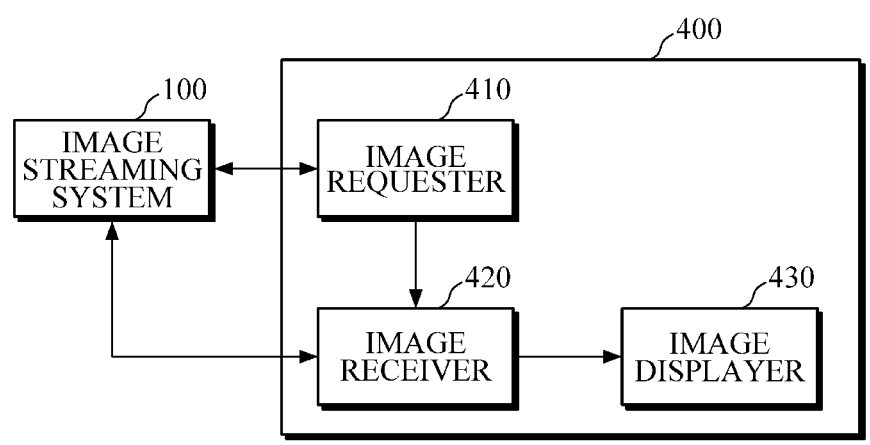
FIG. 4 is a block diagram illustrating an example of a client device.

FIG. 4 is a block diagram illustrating an example of a client device. As illustrated in FIG. 4, a client device 400 includes an image requester 410, an image receiver 420, and an image displayer 430.

The image requester 410 receives streaming service related NVR information from an image streaming system 100 for minimizing resource usage of an NVR, wherein the streaming service related NVR information contains a list of IP cameras registered in an NVR 200. Then, in response to receiving a user's selection of at least one IP camera from the list of IP cameras, the image requester 410 transmits an image streaming request related to the selected IP camera to the image streaming system 100. Then, the image streaming system 100 receives data of images captured by the selected IP camera, and transmits the received data of images to the client device 400.

The image receiver 420 receives the data of images captured by the selected IP camera from the image streaming system 100.

The image displayer 430 displays on a screen the data of images received by the image receiver 420.

In such a configuration, the client device 400 may access the image streaming system 100 to receive a stream of images from the IP camera, and may regard the received stream as coming from the NVR because there is no difference in an user interface (UI) between a method of streaming images through the NVR 200 and a method of streaming images through the image streaming system 100).

Figure 5:
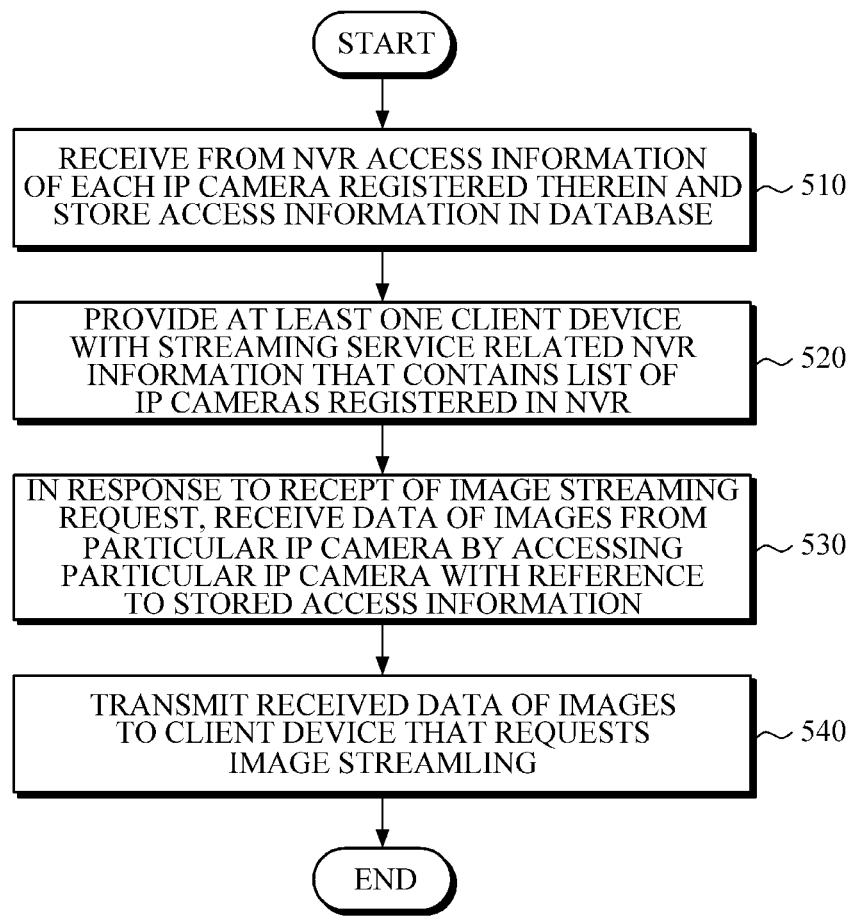
FIG. 5 is a flowchart illustrating an image streaming method of an image streaming system for minimizing resource usage of an NVR according to an exemplary embodiment.

FIG. 5 is provided to explain the above-described image streaming system for minimizing resource usage of an NVR streams images. FIG. 5 is a flowchart illustrating an image streaming method of an image streaming system for minimizing resource usage of an NVR according to an exemplary embodiment.

In operation 510, an image streaming system for minimizing resource usage of an NVR receives, from an NVR, access information of each IP camera registered in the NVR, and stores the access information in a database. For example, access information of an IP camera may include an IP address of the IP camera, and may further include an access ID and a password of the IP camera.

In operation 520, the image streaming system transmits streaming service related NVR information to at least one client device, wherein the streaming service related NVR information contains a list of IP cameras registered in the NVR.

In response to receiving, from the client device, an image streaming request related to at least one IP camera selected from the list contained in the streaming service related NVR information that is received in operation 520, the image streaming system accesses the selected IP camera with reference to the access information stored in operation 510 to receive data of images captured by the selected IP camera in operation 530.

In operation 540, the image streaming system transmits the data of images received in operation 530 to the client device at a remote location that requested image streaming. Then, the client device displays on a screen thereof the data of images that is received from the image streaming system.

Accordingly, the present disclosure does not need to manage IP cameras nor require additional resources to stream images to a client service since the present disclosure has the capability of directly accessing an IP camera registered in the NVR without passing through the NVR to retrieve images from the IP camera and transmit the retrieved images to the client device. As a result, it may prevent an increase in costs for the NVR.

The present disclosure does not need to manage IP cameras nor require additional resources to stream images to a client device at a remote location since it is possible to directly access an IP camera registered in the NVR without passing through the NVR to retrieve images from the IP camera and transmit the retrieved images to the client device, thereby preventing an increase in costs for the NVR.

In addition, the present disclosure is capable of providing a streaming service by changing specification thereof in accordance with the number of users currently connected to a remote client device or the average number of pilot channels, thereby enabled to establish a cost effective system in accordance with customers' demands.

The present disclosure may be applied in NVR image streaming technologies and application thereof.

Those who are skilled in the related art may understand that various and specific modifications may be made without modifying the technical ideas or essential characteristics of the invention. Accordingly, the embodiments disclosed above are exemplary, and should be understandable not to be limited to in all aspects.

What is claimed is:

1. An image streaming system for minimizing resource usage of a Network Video Recorder (NVR), comprising:
an access information manager configured to store, in a database, access information of a plurality of IP cameras registered in the NVR;
an information provider configured to provide streaming service related NVR information to at least one client device, wherein the streaming service related NVR information contains a list of the plurality of IP cameras registered in the NVR;
an image receiver configured to, in response to an image streaming request from a client device that has received the streaming service related NVR information, receive data of images from a particular IP camera of the plurality of IP cameras by accessing the particular IP camera registered in the NVR with reference to the access information stored by the access information manager; and an image transmitter configured to transmit the received data of images to the client device at a remote location, which has received the streaming service related NVR information, wherein the image streaming system is wirely/wirelessly connected to the NVR, the IP cameras, and the client device; accesses the IP cameras registered in the NVR to receive the images from the IP cameras and stream the received images to the client device at the remote location such that the image streaming system does not manage the IP cameras nor require resources of the NVR; and is located discrete from the NVR.

2. The image streaming system of claim 1, wherein the access information manager is further configured to dynamically collect, from the particular NVR, access information of each IP camera registered in the particular NVR and store the collected access information.

3. The image streaming system of claim 1, wherein the streaming service related NVR information contains the list of the IP cameras registered in the NVR.

4. The image streaming system of claim 3, wherein, in response to selection of a particular IP camera from the list of IP cameras registered in the particular NVR contained in the streaming service related NVR information, the client device issues an image streaming request related to the particular IP camera registered in the particular NVR.

5. The image streaming system of claim 4, wherein the image receiver is further configured to retrieve access information of the particular IP camera from the collected access information stored by the access information manager, and access the particular IP camera using the retrieved access information of the particular IP camera.

6. The image streaming system of claim 5, wherein the image transmitter is further configured to, in response to image streaming requests related to an identical IP camera from a plurality of client devices, multicast data of images received from the identical IP camera to the plurality of client devices.

7. The image streaming system of claim 5, wherein the image transmitter is further configured to, in response to image streaming requests related to different IP cameras from a plurality of client devices, unicast data of images received from each of the different IP cameras to the plurality of client devices.

* * * * *